United States Patent
Crowley

(10) Patent No.: US 10,163,157 B2
(45) Date of Patent: Dec. 25, 2018

(54) TRADING OPPORTUNITIES BASED ON PUBLIC TICKER DATA

(71) Applicant: Intercontinental Exchange Holdings, Inc., Atlanta, GA (US)

(72) Inventor: Christopher J. Crowley, Brooklyn, NY (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 14/733,413

(22) Filed: Jun. 8, 2015

(65) Prior Publication Data
US 2015/0269678 A1 Sep. 24, 2015

Related U.S. Application Data

(60) Provisional application No. 62/013,275, filed on Jun. 17, 2014.

(51) Int. Cl.
G06Q 40/00 (2012.01)
G06Q 40/04 (2012.01)
G06Q 40/06 (2012.01)

(52) U.S. Cl.
CPC .............. *G06Q 40/04* (2013.01); *G06Q 40/06* (2013.01)

(58) Field of Classification Search
CPC ................................ G06Q 40/04; G06Q 40/06
See application file for complete search history.

(56) References Cited

U.S. PATENT DOCUMENTS

| 7,599,868 | B1 * | 10/2009 | Tanpoco | G06Q 20/042 705/32 |
| 8,744,960 | B2 * | 6/2014 | Lister | G06Q 20/10 705/30 |
| 2007/0091168 | A1 * | 4/2007 | Lee | H04N 7/163 348/14.01 |
| 2007/0100735 | A1 | 5/2007 | Kemp et al. | |
| 2008/0033867 | A1 * | 2/2008 | Hirani | G06Q 40/04 705/37 |
| 2011/0167051 | A1 * | 7/2011 | Melet | G06Q 10/00 707/706 |
| 2013/0006762 | A1 * | 1/2013 | Greenberg | G06Q 30/02 705/14.49 |
| 2015/0006353 | A1 * | 1/2015 | Gartland | G06Q 40/04 705/37 |
| 2016/0004747 | A1 * | 1/2016 | Matsuura | G06F 17/30474 707/714 |

OTHER PUBLICATIONS

Sadoghi et al.; Efficient Event Processing through Reconfigurable Hardware for Algorithmic Trading; The 36th Intervational Conference on Very Large Data Bases; Singapore, (Sep. 13-17, 2010).*

(Continued)

*Primary Examiner* — Virpi H Kanervo
(74) *Attorney, Agent, or Firm* — DLA Piper LLP (US)

(57) ABSTRACT

Systems and methods for improving an efficiency of a system, including a financial exchange system, includes extracting trade data from one or more external data sources, parsing the trade data to identify trade information, comparing the trade information to one or more parameters, creating new trades based on the trade information only when the one or more parameters are satisfied, and offering the new trades to one or more participants.

30 Claims, 2 Drawing Sheets

(56) References Cited

OTHER PUBLICATIONS

Justin Wolfers and Eric Zitzewitz; Prediction Markets; Journal of Economic Perspectives; vol. 18, No. 2, pp. 107-126 (Spring 2004).*
Glushko et al.; An XML Framework for Agent-Based E-Commerce; Communications of the ACM; vol. 42, No. 3, pp. 106-114 (Mar. 1999).*
Singapore Written Opinion dated Jul. 27, 2017, of corresponding Singapore Application No. 10201504713S.

* cited by examiner

TRADING OPPORTUNITIES BASED ON PUBLIC TICKER DATA

TECHNICAL FIELD

This disclosure is generally related to the improving system efficiencies, and more particularly to improving system efficiencies in electronic computer systems that generating trading opportunities.

BACKGROUND

Various electronic trading platforms currently exist to facilitate and execute trades of varying size and scope between market participants. Trading platforms are typically specialized and may operate within specific asset classes. Trade execution information generated by a trading platform may be shared internally with other parties on the trading platform. Processes such as "work up" have traditionally been run solely by the inter-dealer broker that arranged the original trade, as they were the only execution venue with knowledge of the trade at that time. This, in turn, means that other market participants within the same trading platform may only have one opportunity to participate in a work-up session off the back of a trade, and as a result may not be able to achieve execution because, for example, the execution venue where the work-up session is being operated may use an algorithm that prioritizes for matching the orders of other participants. In other words, trade data is available only for a particular platform to make a new trade on that platform.

For competitive reasons, trading platforms do not widely share their trade data with other platforms. A trading platform may choose to publish their trade data externally on a ticker for a fee. However, the ticker trade data includes a time delay such that a different trading platform is unable to provide the same trade to its users in a timely manner that market participants are willing to execute on. New trade offers based on stale trade data provide little value to market participants. Thus, even when trade execution data is shared to the broad market by a trading platform, the shared information quickly becomes out of date and untimely such that other trading platforms are unable to utilize the information as a basis for a new trade. This opaqueness limits the ability of current systems to facilitate trades based on trades executed elsewhere in the market. As a practical matter, new trades based on previously executed trades are limited technologically to the participants of the same platform. Even if market wide trade data is shared from every trading platform, there is no solution available to utilize that information in a timely manner to offer and execute new trades based on executed trades.

Consequently, it is desirable to have a new type of trading system and method that procures, receives and only processes the external executed trade data that is suitable for generating timely and relevant trade opportunities based on the executed trades to enable market participants to execute new trades while at the same time conserving the resources of the trading system by avoiding needless processing of unsuitable data.

SUMMARY

The present disclosure relates generally to a method and a system for improving an efficiency of an electronic system. In one embodiment, a method of the present disclosure includes an electronic financial exchange system procuring executed trade data from one or more external data sources. The trade data is parsed and compared to predetermined parameters to determine whether the information included in the trade data is suitable for generating timely and/or relevant trade opportunities. If it is determined that the trade data is suitable, only then will new trades be generated and offered to participants. Otherwise, the electronic system avoids creating or offering new trades, thereby conserving system resources and improving its operating efficiency.

In some embodiments, the external sources may include public data feeds. The public data feeds may include published trade data. The public data feeds may be provided by a swap data repository. The assets (e.g., financial instruments) to which the executed trade data pertains may include at least one of outright options, spread options, option combinations, commodities, derivatives, shares, bonds and currencies, wherein derivatives comprise at least one of options, caps, floors, collars, structured debt obligations and deposits, swaps, futures, forwards and combinations thereof. The derivative is derived from another underlying financial instrument.

In some embodiments, the new trades may be offered for bids and offers from the participants for a predetermined amount of time and/or until new trade data is deemed suitable for offering even newer trading opportunities. The new trades may be executed in a volume clearing session.

In some embodiments, parameters that may be used to determine whether the trade data is suitable for offering new trading opportunities may include, without limitation, a last executed trade price, a time delay between an execution time of an asset and a reception time of the financial exchange system of the executed trade data, price volatility of an asset (which may be based on historic trade data), data quality of trade data, liquidity of an asset, a predetermined event (e.g., occurrence of the event and/or a time at which the event occurred), a trading volume of an asset and/or any other parameter. The received executed trade data may be mapped to the financial exchange system.

In another embodiment, a financial exchange system may include an electronic exchange server comprising at least one processor and at least one non-transitory computer-readable storage medium having computer-readable program instructions stored therein. The computer-readable program instructions, when executed, cause the electronic exchange server to perform any or all of the feature and functions described herein.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
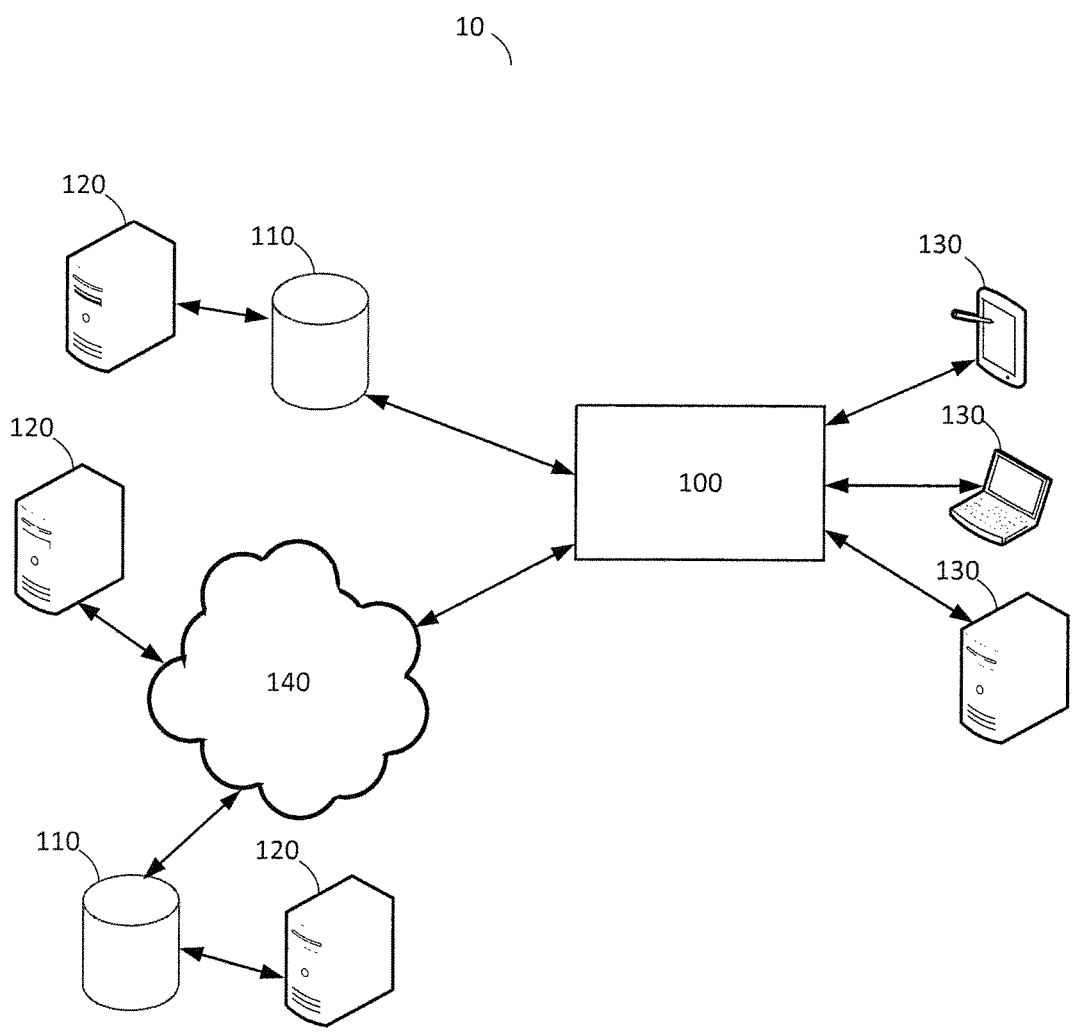
FIG. 1 is a diagram illustrating a system diagram for improving efficiency while generating new trade opportunities.

The present disclosure relates generally to systems and methods for improving an efficiency of electronic systems. In an exemplary embodiment, the systems and methods provide for creating and offering new trades only after it has been determined that the information on which the new trades are based is timely, suitable and/or otherwise desirable to participants. If it is determined that the information does not satisfy one or more parameters (e.g., to establish its timeliness, suitability, desirability, etc.), the information is not used to create and/or offer the new trades. In this manner, a system implementing the functions and features described herein is able to avoid needlessly creating and offering trades, thereby improving its operating efficiency.

Exemplary implementations of this disclosure may parse trade data received and/or pulled or extracted from external sources to determine executed trade information that may serve as the parameters for subsequent trades that clear up interest in the market for an asset at a given point in time. A timely last executed trade price, for example, may be determined from the trade data and a financial exchange system may offer a trade between two or more participants at the timely last executed trade price.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with an electronic exchange system, such as, for example, any public and/or private networks, including, for instance, the Internet, an intranet, or an extranet, any wired or wireless networks or combinations thereof.

The terms "electronic exchange server", "electronic exchange system" and "financial exchange system" may be used interchangeably and shall refer to any type of a computing device, system or venue that is capable of carrying out electronic asset exchange transactions. For example, an electronic exchange system may refer to a commodities exchange, a futures execution facility, an options exchange, a cash equities exchange, a swap execution facility, an unregulated electronic transaction execution venue or any other type of an exchange venue known in the art. The electronic exchange server may comprise one or more processors configured to execute instructions stored in a non-transitory memory. The electronic exchange server may be configured to place orders in connection with financial instruments over a network when the instructions are executed. An electronic exchange server may be embodied on a single computing device, while in other embodiments, an electronic exchange server may refer to a plurality of computing devices housed in one or more facilities that are configured to jointly provide local or remote computing services to one or more users or user devices. The electronic exchange server may send and receive data from user devices, data servers, or any other type of computing devices or entities over the Internet, over a Wi-Fi connection, over a cellular network or via any other wired or wireless connection or network known in the art.

The term "asset" shall refer to any type of financial instrument of any class, such as, without limitation, outright options, spread options, option combinations, commodities, derivatives, shares, bonds and currencies. The term "derivatives" shall further refer to any type of options, caps, floors, collars, structured debt obligations and deposits, swaps, futures, forwards and various combinations thereof or any other type of financial instruments that derive from another underlying financial instrument.

The term "trade" shall refer to any type or part of a transaction or exchange that may occur in connection with one or more financial instruments.

For purposes of this disclosure, published trade data is referred to herein as "public ticker" or "public feeds". In addition, it should be understood that the terms "public ticker" or "public feed" as used herein should be broadly construed to encompass any market, geographic location or region, for example, any public tickers or public feeds pertaining to the US, Europe, Asia or any other one or combination of markets.

Although the dissemination of trade data has traditionally been lacking, there has become an increased level of post-execution transparency in many financial markets over the last few years, particularly, but not solely driven by legislative action, or through new regulatory or other legal requirements, such as imposed by the Dodd Frank Act, to publish trade data provided by Swap Data Repositories ("SDRs") and similar such publicly available feeds, such as Options Price Reporting Authority ("OPRA"), European Market Infrastructure Regulation ("EMIR") and Trade Reporting And Compliance Engine ("TRACE") (same in cash equities and equity options, futures and options on futures, cash bonds, etc.).

The novel trading platform of this disclosure offers new trade opportunities based not only on transactions executed on the same trading platform, but also based on transactions executed on other trading platforms so as to effectively clear up all interest in the market at any point in time. Previous solutions were limited to transactions executed within a single trading platform able to clear up interest only within the participants of the single trading platform, and not the broader market. The solutions described herein require the power, speed and precision of a special purpose computer programmed to execute the algorithms described herein that is not a mere method of organization or which may be executed by a human in a plausible manner, Instead, the systems and methods described herein are necessarily rooted in computer technology in order to overcome a problem specifically arising in the realm of computer networks so as to provide an improvement in the functioning of a computer, computer system and/or computer network.

While the published trade data provided by the SDRs provides greater transparency to the market, public ticker data is imperfect and not necessarily provided in real-time and therefore cannot be taken at face value. Simply receiving and integrating public ticker data into a trading platform to execute trades based on the public ticker data falsely assumes that the public ticker data is reliable, timely and useful. However, regulatory obligations only require certain trades to be reported to an SDR as soon as technologically practicable. Reporting latency, repository latency and network latency may all combine to render otherwise real-time trade prices stale. For instance, a trading platform may normally transmit the details of an executed trade to an SDR within a second, but it may take several seconds due to delay caused by high server load on a busy trading day. Similarly, latency at an SDR may add 15-20 seconds before a trade is published on a public ticker, for example. Depending on the asset type, prices may move such that a delay in the tenths of seconds may render the published prices stale.

If received in a timely manner, published trade data may be utilized by a trading platform to provide additional trading opportunities to interested participants, such as through the offering of a volume clearing matching session. An executed trade indicates completion of a price discovery process and sends a strong signal to all interested market participants to transact at the price of the executed trade, assuming that the executed trade is the most recently executed trade.

For example, a buyer may be willing to execute a trade at a given price without a counterpart seller on the other side of that market who will agree to the transaction. But if a transaction is executed in the marketplace elsewhere at the given price and is quickly disseminated to other market participants in a timely manner, then there is a higher likelihood that other buyers and sellers will transact at that executed price. Some market participants who are interested in a trade at a given price may be prompted to execute a new trade once informed of the last executed price because of a fear of missing out if they do not execute at this moment. However, the willingness of market participants to execute a new trade at the same price as an executed trade disappears when the executed price becomes out of date or stale, which may not take long.

Turning now to FIG. 1, an exemplary system 10 for improving efficiency while generating at least one trade opportunity is shown. The system 10 comprises a financial exchange system 100 that may be an electronic exchange server, Swap Data Repositories (SDR) 110, external (data) sources 120, and user devices 130. Each of the electronic exchange server 100, SDRs 110, external sources 120, and user devices 130 may comprise one or more computing devices that include non-transitory memory for storing instructions and a processor for executing the instructions.

The financial exchange system 100, SDRs 110, external sources 120, and user devices 130 may communicate with each other over at least one network 140, including, but not limited to the Internet, Wi-Fi connections, cellular networks or any other wired or wireless connection or network known in the art. The user devices 130 may comprise a desktop computer, a laptop, a smartphone, tablet, or any other user device known in the art. A user may interact with the financial exchange system 100 via a graphical user interface (not shown) displayed on any type of display device including a computer monitor, a smart-phone screen, tablet, a laptop screen or any other device providing information to a user.

The financial exchange system 100 may be configured to receive market data relating to a financial asset from the SDR 110 and external source 120. Execution of the instructions may cause the financial exchange system 100 to perform any of the features described above, and those further described below. A financial exchange system 100 may be embodied on a single computing device, while in other embodiments, the financial exchange system 100 may refer to a plurality of computing devices housed in one or more facilities that are configured to jointly provide computing services to remote devices.

The financial exchange system 100 may be configured to receive trade data for a financial asset such as from a public ticker, public feed, subscription ticker service or from another trading platform. The financial exchange system 100 may be configured to receive trade data from open market sources, private market sources, internal sources, or from any other source. The trade data may include at least one parameter of an executed asset trade. The financial exchange system 100 may be configured to offer a trade between two or more participants 130 at the timely last executed trade price derived from the received trade data.

Figure 2:
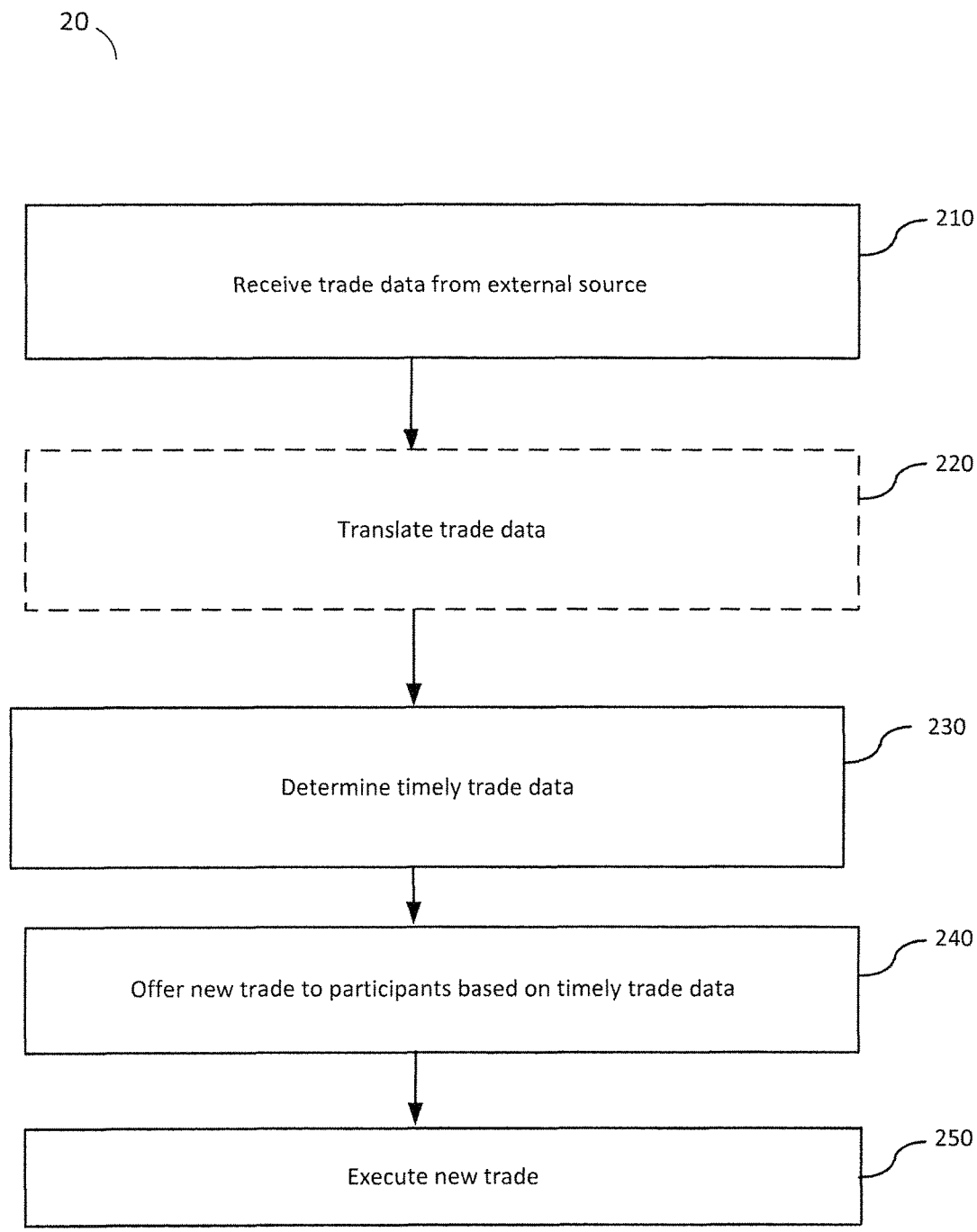
FIG. 2 is a flowchart diagram illustrating an exemplary method for improving a system's efficiency while generating new trade opportunities.

The method 20 of FIG. 2 demonstrates an exemplary sequence of steps performed by an electronic exchange server and/or any other properly configured computing device(s) including (for example) the system 10 shown in FIG. 1. At step 210, an electronic exchange server (or any other computing device(s) specially-configured according to this disclosure) procures and receives executed trade data relating to a financial asset from an external source. As noted previously, trade data may be published for a variety of reasons, such as due to legislation, regulatory or legal requirements, or a party may voluntarily publish trade data (e.g., for a fee or at no cost). The electronic exchange server may receive a plurality of external feeds at step 210.

In some embodiments, the electronic exchange server polls one or more public feed websites operated by one or more SDR(s) (or other external sources or feeds) at a predetermined rate based on one or more parameters (e.g., every few seconds) and scrapes (or pulls) data (e.g., executed trade data) from the public feed website(s) (e.g., ticker or other source) that may be provided in a text format, XML file or other document structure. The predetermined rate may be related to the type of trade data being polled and/or the type of assets to which the trade data pertains. The executed trade data may be pulled and received remotely over a network and/or it may be pulled or received locally. As should be understood, data from public tickers or public feeds may be utilized for a variety of purposes, across multiple asset classes, and in connection with any type of trade. The external source may be a public feed, such as from a swap data repository providing published trade data.

At step 220, the pulled executed trade data may be mapped to a format of a financial exchange system. This process may be referred to as a translation of the executed trade data. For instance, the electronic exchange server may be further configured to translate the pulled executed trade data into a common format suitable for the electronic exchange system. Although standard identifier formats may be preferred for formatting trade data information, market participants often submit non-standard descriptors of a contract to hinder the spread of their information and/or to avoid potential licensing fees. As a result, the present disclosure may map the executed trade data into a suitable format prior to analysis and processing. However, there is no requirement that executed trade data pulled from the SDR(s) or other external source must be provided in a common format.

At step 230, a determination may be made as to the timeliness and/or suitability of last executed trade prices (included in the executed trade data) pulled from the SDR(s) and/or external source(s). Processing of executed trade data may determine timeliness and/or suitability of the executed trade data as a basis for offering a new trade. For example, the duration for which an executed price remains timely depends on the asset. Trade data that is not timely may be understood as out-of-date, stale or untimely. For example, the timeliness of a last executed trade price may be determined by comparing an execution time of the executed trade to which the trade price pertains to a time at which the trade price was pulled. The result of the comparison may be compared to one or more pre-established parameters (e.g., a particular length of time) to determine if the pulled trade price is still timely and/or otherwise suitable. If the trade price is deemed timely and/or suitable after the comparison, new trades may be offered at that trade price. In an embodiment, certain assets or classes of assets may be deemed timely and/or suitable based on one or more different parameters.

Additionally, a plurality of other parameters and/or factors may also (or alternatively) be considered to filter the pulled trade data to determine whether it includes a timely or otherwise suitable last executed trade price for use in generating an attractive trade for market participants to execute on. Here, timeliness and suitability is not necessarily limited temporally, but may include other and/or alternative factors including, but not limited to accuracy, relevance, reliability, etc. In some embodiments, timeliness refers to a price that accurately reflects a market price at a current (or specific) point in time for which market participants are willing to execute on. However, even if received trade data reflects a current market price, other parameters and/or factors may render the last executed trade price untimely, and therefore unattractive to market participants.

The processing in step 230 may include an analysis of the execution time of the pulled trade data and a comparison to a specific point in time or a time at which the trade data is pulled or received by an electronic exchange system to determine an amount of delay. A predetermined allowable delay may be set to screen out trade data representing trades that are considered too old due to regulatory delay, technical delay, etc. The allowable time delay (e.g., the tolerance) of public trade data pulled by the electronic exchange server may depend on one or more factors including, the asset class, data source, trade parameters, and so forth, as noted above.

For instance, different contracts have different levels of liquidity. Some very illiquid contracts may allow a delay of a minute or so. However, extremely liquid contracts that generate frequent trades may allow delays up to two seconds. Therefore, trade data having a difference between execution time and reception time greater than two seconds, in this example, may be excluded from generation and/or offering of a new trade opportunity for one asset class but would be allowed for another asset class up to ten seconds. To illustrate further, interest rate swap trades may be filtered if delayed by more than two seconds. In this manner, a timely last executed trade price may be based on liquidity of an asset of the trade.

In addition to time delay, external trade data may also be processed for accuracy, to ensure that the trade data is reliable. In some implementations, the parameters of the trade data may be evaluated and compared. For example, an instrument name may include a number indicating a maturity date. However, if the maturity date information within the trade data does not match the instrument name, then the trade data may be erroneous and may be excluded. Other parameters of the trade data may be cross-referenced with other data sources and analyzed to determine if the trade data is accurate and/or otherwise reliable and suitable.

Trade data may be filtered and/or evaluated based on action type. A cancelation message that follows a trade message, for example, may include the original transaction information as well as a cancelation code. However, if not processed properly, the cancellation message may appear identical to the initial trade message and appear as a newly executed transaction. The systems and methods of this disclosure may be configured to scrutinize trade data in a manner that identifies cancellation messages and cancellation codes, thereby avoiding inadvertently processing the cancellation message as a trade message.

In some embodiments, a timely last executed trade price may be determined based on a trading volume. Block transactions may be identified and excluded as non-timely (or non-suitable) for use in offering new trades because many block transactions have a regulatory obligation to delay reporting by fifteen minutes, which is different than other non-block transactions. As a result, there is a high probability that the market prices for the block transactions are stale and untimely. Furthermore, a price for a block transaction may not reflect the market price for a non-block size trade.

Another (non-limiting) characteristic that may be used to determine whether trade data is suitable for generating a new trade opportunity includes the relevance of the trade data in generating a new trade opportunity that is attractive to other market participants. For example, bilateral trades may have a bespoke price dependent upon a counterparty credit quality, which may render these trades as inappropriate in a volume clearing session. Also, trades that are known or suspected to be hedges for other transactions may be excluded as well. For instance, delta hedges for options, where the price at which the delta hedge will be traded may have been fixed well in advance of the actual trade being negotiated/executed may be filtered from generation of a volume clearing session. Trade data corresponding to an individual leg of a package transaction may be excluded as the individual leg may not accurately reflect the market price for that leg at that time, even if the price of the overall package is accurate.

Trade data may be analyzed to determine if the prices are within reasonable expectations, such as through predetermined price volatility for each asset type. For example, high price volatility may indicate a price that is not reflective of the market. In particular, a determination may be performed of how different the most recent transaction price is from the last known transaction or from a mid-market currently visible on an electronic trading platform. Price volatility may be based on historic data as well. Price volatility may also indicate errors in data quality and eliminate the generation of volume clearing sessions that have a high likelihood of bad input data that would not generate interest from either side of a transaction.

Determination of timely trade data ensures that an excessive number of trade opportunities and/or volume clearing sessions are not generated, and that market participants are presented only with the trade opportunities that are most likely desirable and suitable for execution. In this manner, the systems and method of this disclosure is able to avoid and/or limit the generation and presentation of trade opportunities that are ultimately deemed unsuitable or undesirable, thereby reducing the processing requirements of the systems' component (e.g., electricity, processor capacity, memory, etc.) and increasing their respective operating efficiencies.

Timely trade data may also be determined based on predetermined events such as the release of economic news or other newsworthy events. For example, monetary policy announcements by the Federal Reserve with regard to interest rates may lead to an explosion of trading by high frequency traders immediately after the announcement. With high frequency trading, a platform may receive trade data for twenty (or more) trades on the same contract in less than a second which meet every other criteria for triggering a volume clearing session. However, simultaneously triggering twenty corresponding trades in such a short period of time may be impractical and create undue confusion for market participants on a platform.

At step 240, a trade may be offered between two or more participants at the timely last executed trade price. A first example set forth herein relates to using the last traded price reported on a public feed to run a Market Order Volume Clearing (MOVC) session, or a post-trade Volume Clearing (VC) session, where a price is published to all market participants on the platform, and there is a window of time during which the market participants may enter bids and/or offers to trade at the published price.

A second example relates to running a continuous Volume Clearing Session that is always open throughout the availability of the trading platform where the price at which trading occurs may always be the last price read from the public ticker.

The trade may be offered for bids and offers from the participants for a predetermined amount of time and/or until a subsequent timely (or otherwise suitable) last executed trade price is determined at which time the trade is closed.

Trade data filtering may limit how often the frequency of offering new trades occurs. For example, a new volume clearing session may be prevented from triggering if a similar volume clearing session has been opened within a predetermined time period (e.g., five seconds, half-second).

At step 250, the market participants may agree to the new trade offered on the electronic exchange server based on at least one parameter of an executed public trade. The electronic exchange server then processes and executes the trade.

The foregoing embodiments and examples are provided merely for the purpose of explanation and are in no way to be construed as limiting. While references to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as those that are within the scope of the appended claims.

The invention claimed is:

1. A computer-implemented method of improving an efficiency of an electronic system, comprising:
   in an electronic financial exchange system comprising at least one computer in electronic communication with one or more external data sources and a remote computer via a network, the at least one computer comprising at least one processor and at least one non-transitory computer-readable storage medium having computer-readable program instructions stored therein, the computer-readable program instructions, when executed, causing the at least one computer to perform the steps of:
   polling the one or more external data sources for executed trade data, said polling comprising pulling, by the at least one computer over a channel, the executed trade data directly from said one or more external data sources at a predetermined rate that is determined, by said at least one computer, according to one or more assets associated with the executed trade data and independently of said one or more external data sources;
   receiving the executed trade data responsive to said polling;
   determining that the executed trade data comprises data in a format other than a standard format;
   executing further computer-readable program instructions embodied in a special purpose translator and a parser, responsive to said determining, thereby causing the at least one computer to perform the additional steps of:
   translating, via the special purpose translator, the executed trade data in the format other than the standard format into data having the standard format, the electronic financial exchange system configured to process executed trade data in the standard format and
   parsing, via the parser, the translated executed trade data to identify trade information;
   comparing the trade information to one or more parameters;
   determining whether the trade information satisfies at least one of the one or more parameters;
   creating one or more new proposed transactions based on the trade information only when it is determined that the trade information satisfies the at least one of the one or more parameters; and
   offering the one or more new proposed transactions to one or more participants by automatically activating a graphical user interface on the remote computer to cause the graphical user interface to automatically display the one or more new proposed transactions.

2. The method of claim 1, wherein the one or more external data sources comprises one or more public feeds.

3. The method of claim 2, wherein the one or more public feeds comprises published trade data.

4. The method of claim 3, wherein the one or more public feeds is provided by a swap data repository.

5. The method of claim 1, wherein the one or more assets comprises at least one of an outright option, a spread option, an option combination, a commodity, a derivative, a share, a bond and a currency, wherein the derivative comprises at least one of options, caps, floors, collars, structured debt obligations and deposits, swaps, futures, forwards and combinations thereof, wherein the derivative is derived from another underlying financial instrument.

6. The method of claim 1, further comprising:
   receiving, by the electronic financial exchange system, at least one of bids and offers for the one or more new proposed transactions from the one or more participants for a predetermined amount of time.

7. The method of claim 1, further comprising:
   receiving, by the electronic financial exchange system, at least one of bids and offers for the one or more new proposed transactions from the one or more participants until it is determined, by the electronic financial exchange system, that new trade information parsed from new executed trade data satisfies the at least one of the one or more parameters.

8. The method of claim 7, further comprising:
   terminating the offering of the one or more new proposed transactions when it is determined that the new trade information parsed from the new executed trade data satisfies the at least one of the one or more parameters.

9. The method of claim 1, further comprising:
   offering the one or more new proposed transactions as part of a volume clearing session.

10. The method of claim 1, wherein the trade information comprises a last-executed trade price of the one or more assets.

11. The method of claim 10, wherein the one or more parameters comprises a time parameter, the method further comprising:
   comparing a time of the last-executed trade price to a time at which the executed trade data is polled to determine a time delay; and
   comparing the time delay to the time parameter to determine whether the time parameter is satisfied.

12. The method of claim 1, wherein the one or more parameters comprises a price volatility of the one or more assets.

13. The method of claim 12, wherein the price volatility is based on historic trade data.

14. The method of claim 1, wherein the one or more parameters comprises at least one of a data quality of the trade information, a liquidity of the one or more assets, an occurrence of a predetermined event and a trading volume of the one or more assets.

15. The method of claim 1, further comprising:
mapping the executed trade data to the standard format of the electronic financial exchange system.

16. An electronic system with improved efficiency, comprising:
an electronic exchange server comprising at least one processor and at least one non-transitory computer-readable storage medium having computer-readable program instructions stored therein, the electronic exchange server in electronic communication with one or more external data sources and a remote computer via a network, the computer-readable program instructions, when executed, causing the electronic exchange server to:
poll the one or more external data sources for executed trade data, said polling comprising pulling, by the electronic exchange server over a channel, the executed trade data directly from said one or more external data sources at a predetermined rate that is determined, by said electronic exchange server, according to one or more assets associated with the executed trade data and independently of said one or more external data sources;
receive the executed trade data responsive to said polling;
determine that the executed trade data comprises data in a format other than a standard
format;
translate, by a special purpose translator on the electronic exchange server, the translator comprising computer-readable instructions causing the translator to convert the executed trade data in the format other than the standard format into data having the standard format, the electronic exchange server configured to process executed trade data in the standard format;
parse, by a parser on the electronic exchange server, the translated executed trade data to identify trade information, said parser executing computer-readable instructions to perform the identifying;
compare the trade information to one or more parameters;
determine whether the trade information satisfies at least one of the one or more parameters;
create one or more new proposed transactions based on the trade information only when it is determined that the trade information satisfies the at least one of the one or more parameters; and
offer the one or more new proposed transactions to one or more participants by automatically activating a graphical user interface on the remote computer to cause the graphical user interface to automatically display the one or more new proposed transactions, wherein the parse function eliminates at least a portion of the executed trade data, thereby reducing computational processing of new trade offerings by the at least one processor and operational requirements of the at least one processor.

17. The system of claim 16, wherein the one or more external data sources comprises one or more public feeds.

18. The system of claim 17, wherein the one or more public feeds comprises published trade data.

19. The system of claim 18, wherein the one or more public feeds is provided by a swap data repository.

20. The system of claim 16, wherein the one or more assets comprises at least one of an outright option, a spread option, an option combination, a commodity, a derivative, a share, a bond and a currency, wherein the derivative comprises at least one of options, caps, floors, collars, structured debt obligations and deposits, swaps, futures, forwards and combinations thereof, wherein the derivative is derived from another underlying financial instrument.

21. The system of claim 16, wherein the computer-readable program instructions, when executed, further cause the electronic exchange server to:
receive at least one of bids and offers for the one or more new proposed transactions from the one or more participants for a predetermined amount of time.

22. The system of claim 16, wherein the computer-readable program instructions, when executed, further cause the electronic exchange server to:
receive at least one of bids and offers for the one or more new proposed transactions from the one or more participants until it is determined, by the electronic exchange server, that new trade information parsed from new executed trade data satisfies the at least one of the one or more parameters.

23. The system of claim 22, wherein the computer-readable program instructions, when executed, further cause the electronic exchange server to:
terminate the offering of the one or more new proposed transactions when it is determined that the new trade information parsed from the new executed trade data satisfies the at least one of the one or more parameters.

24. The system of claim 16, wherein the computer-readable program instructions, when executed, further cause the electronic exchange server to:
offer the one or more new proposed transactions as part of a volume clearing session.

25. The system of claim 16, wherein the trade information comprises a last-executed trade price of the one or more assets.

26. The system of claim 25, wherein the one or more parameters comprises a time parameter and wherein the computer-readable program instructions, when executed, further cause the electronic exchange server to:
compare a time of the last-executed trade price to a time at which the executed trade data is polled to determine a time delay; and
compare the time delay to the time parameter to determine whether the time parameter is satisfied.

27. The system of claim 16, wherein the one or more parameters comprises a price volatility of the one or more assets.

28. The system of claim 27, wherein the price volatility is based on historic trade data.

29. The system of claim 16, wherein the one or more parameters comprises at least one of a data quality of the trade information, a liquidity of the one or more assets, an occurrence of a predetermined event and a trading volume of the one or more assets.

30. The system of claim 16, wherein the computer-readable program instructions, when executed, further cause the electronic exchange server to map the executed trade data to the standard format of the electronic exchange server.

* * * * *